US012006752B1

(12) United States Patent
Wu et al.

(10) Patent No.: US 12,006,752 B1
(45) Date of Patent: Jun. 11, 2024

(54) DOOR LIMITING MECHANISM AND ELECTRIC APPLIANCE CABINET

(71) Applicant: Hangzhou Jinsong Euna Electrical Appliances Co., Ltd., Zhejiang (CN)

(72) Inventors: Zheng Wu, Zhejiang (CN); Xianshan Liu, Zhejiang (CN); Jianchun Wu, Zhejiang (CN); Chaoyang Tang, Zhejiang (CN); Genji Chen, Zhejiang (CN)

(73) Assignee: Hangzhou Jinsong Euna Electrical Appliances Co., Ltd., Zhejiang (CN)

( * ) Notice: Subject to any disclaimer, the term of this patent is extended or adjusted under 35 U.S.C. 154(b) by 143 days.

(21) Appl. No.: 18/111,935

(22) Filed: Feb. 21, 2023

(51) Int. Cl.
*E05D 7/02* (2006.01)
*E05D 11/10* (2006.01)
*F25D 23/02* (2006.01)

(52) U.S. Cl.
CPC ............ *E05D 7/02* (2013.01); *E05D 11/1007* (2013.01); *F25D 23/028* (2013.01); *E05Y 2900/30* (2013.01); *F25D 2323/022* (2013.01)

(58) Field of Classification Search
CPC ..... E05D 7/02; E05D 11/1007; F25D 23/028; F25D 2323/022; E05Y 2900/30
See application file for complete search history.

(56) References Cited

U.S. PATENT DOCUMENTS 3,889,419 A * 6/1975 Maleck ................ E05D 15/505 49/382
4,495,673 A * 1/1985 Khan .................... E05D 15/505 16/DIG. 23
4,503,582 A * 3/1985 Gurubatham ......... E05D 15/505 16/DIG. 23
5,064,255 A * 11/1991 Inui ......................... F25D 23/02 49/504
5,222,792 A * 6/1993 Kai ......................... E05F 7/005 312/406
5,675,934 A * 10/1997 Park ...................... F25D 23/028 16/DIG. 23

(Continued)

FOREIGN PATENT DOCUMENTS

CN 104329879 A * 2/2015
CN 106766586 A 5/2017

(Continued)

*Primary Examiner* — Hanh V Tran

(74) *Attorney, Agent, or Firm* — Cooper Legal Group, LLC

(57) ABSTRACT

The present application relates to a door limiting mechanism and electric appliance cabinet. The door limiting mechanism includes a connecting assembly, a locking assembly and an abutting assembly, in which the connecting assembly includes a fixed member, a locking groove is provided in the fixed member, the locking assembly includes a rotatable member and a locking member, the locking member is fixedly connected to the rotatable member for passing through the locking groove to form a locking structure, and the abutting assembly is configured to lock the locking member in the locking groove. An electric appliance includes a cabinet body and a door body, in which the door limiting mechanism is provided in the door body, there are two locking assemblies, each of the locking assemblies is connected to the cabinet body by one connecting assembly, and two locking assemblies are symmetrically arranged.

7 Claims, 11 Drawing Sheets

B

C

(56) References Cited

U.S. PATENT DOCUMENTS

| | | | | |
|---|---|---|---|---|
| 6,000,771 | A * | 12/1999 | Wissinger | F25D 23/02 312/401 |
| 2004/0040212 | A1* | 3/2004 | Kawabata | F25D 23/028 49/193 |
| 2005/0251962 | A1* | 11/2005 | De Mello | F25D 23/028 16/262 |
| 2007/0256447 | A1* | 11/2007 | Leimkuehler | E05D 15/505 62/440 |
| 2008/0172838 | A1* | 7/2008 | Choi | E05D 15/505 312/405 |
| 2014/0075844 | A1* | 3/2014 | Walker | E05F 7/005 292/202 |
| 2015/0361704 | A1* | 12/2015 | Larsen | E05F 1/10 49/386 |
| 2017/0284143 | A1* | 10/2017 | Berchowitz | E05C 3/046 |
| 2018/0135343 | A1* | 5/2018 | Heater | E05D 15/52 |
| 2019/0086139 | A1* | 3/2019 | Xingbiao | F25D 23/028 |
| 2019/0145140 | A1* | 5/2019 | Zhang | F25D 23/028 49/382 |
| 2019/0145695 | A1* | 5/2019 | Xia | E05D 15/50 312/405 |
| 2019/0178564 | A1* | 6/2019 | Steiger | E05D 11/06 |
| 2019/0186182 | A1* | 6/2019 | Zhang | E05D 7/12 |
| 2022/0136760 | A1* | 5/2022 | Wu | E05D 15/505 312/405 |

FOREIGN PATENT DOCUMENTS

| | | | | |
|---|---|---|---|---|
| JP | 02153184 | A * | 6/1990 | E05D 15/505 |
| JP | 03271684 | A * | 12/1991 | |
| JP | 04048183 | A * | 2/1992 | |
| JP | 04148180 | A * | 5/1992 | |
| JP | 07301484 | A * | 11/1995 | E05D 15/505 |
| JP | 09159349 | A * | 6/1997 | E05D 15/505 |
| JP | 09303942 | A * | 11/1997 | E05D 15/50 |
| JP | 11141218 | A * | 5/1999 | E05D 15/505 |
| JP | 2003302151 | A * | 10/2003 | |
| JP | 2005068996 | A * | 3/2005 | |
| JP | 2012037147 | A * | 2/2012 | |
| JP | 2015004472 | A * | 1/2015 | E05D 11/1014 |

* cited by examiner

DOOR LIMITING MECHANISM AND ELECTRIC APPLIANCE CABINET

TECHNICAL FIELD

The present application relates to a field of electric appliance and in particular, relates to a door limiting mechanism and an electric appliance cabinet.

BACKGROUND ART

The electric appliances currently sold in the market such as a refrigerator, a wine cabinet or a storage cabinet generally adopt a structure which can be opened from a single side. The doors of these appliances can only be opened from the left side or the right side. In actual use, once the opening side is blocked by an obstacle or a person, the door is difficult to be opened. Therefore, an electric appliance that can be opened from both sides appear on the market. China patent application no. CN106766586A discloses a door opening mechanism from left and right sides and a refrigerator. The door opening mechanism from left and right sides includes a hinge module and a transmission module provided in a refrigerator cabinet body and a refrigerator door body. The hinge module is rotatably fixed with the transmission module on at least one end. A hinge structure with an opening is matched with a door shaft to realize opening from left or right side.

However, the hinge structure is movable relative to the door shaft in a close state of the refrigerator door. If a user operates improperly, it is very easy to cause the door body to fall off, which has a great hidden danger in security.

SUMMARY

The present application provides a door limiting mechanism and an electric appliance cabinet.

In a first aspect, the present application provides a door limiting mechanism by adopting the following technical solution.

A door limiting mechanism includes a connecting assembly, a locking assembly and an abutting assembly, in which the connecting assembly, which is configured to connect a door body to other structure, includes a fixed member fixedly connected to the door body, and a locking groove is provided in the fixed member, the locking assembly includes a rotatable member and a locking member, the rotatable member is rotatably connected to the door body, the locking member is fixedly connected to the rotatable member for passing through the locking groove to form a locking structure, and the abutting assembly is configured to lock the locking member in the locking groove.

In the above technical solution, the door limiting mechanism can be applied to cabinet structures such as electric appliance cabinet. The connecting assembly connects the door limiting mechanism to the cabinet body. The locking assembly can form a locked connection between the door body and the cabinet body. The abutting assembly further fastens the locking structure, reducing the possibility of unlocking of the locking member due to improper operation of the locking structure by users, so as to avoid the door body from falling off.

In some embodiments, an oblong groove is provided in the rotatable member, the locking assembly further includes a driving member rotatably connected to the door body, a driving protrusion is fixedly connected to the driving member, the driving protrusion is slidably connected in the oblong groove, the driving member is driven to rotate, so that the driving protrusion is slid in the oblong groove to drive the rotatable member to rotate.

In the above technical solution, the driving member is rotated, so that the driving protrusion is slid in the oblong groove to drive the rotatable member to rotate. The locking structure is unlocked, so that the door body can be opened. the driving member can be designed to have a substantially same length with the door body, facilitating the user to operate.

In some embodiments, the locking assembly further includes an elastic returning member, the elastic returning member is connected to the rotatable member, the elastic returning member is deformed under force when the locking member is disengaged from the locking groove.

In the above technical solution, by providing the elastic returning member, the elastic returning member is twisted under force when the user rotates the driving member, and the rotatable member can be back to the origin position under elastic force when the user releases the driving member.

In some embodiments, the abutting assembly includes a transmission member and an abutting member, in which an inclined surface is provided in the transmission member, the transmission member is slidably connected to the door body in a first direction, the abutting member is configured to abut against the inclined surface, the abutting member is slidably connected to the door body in a second direction, the transmission member is slid for driving the abutting member to slide, so that the locking member is locked in the locking groove.

In the above technical solution, the transmission member is slid in a first direction. The transmission direction of force is changed by the inclined surface, so that the abutting member can push the locking member to lock in the locking groove.

In some embodiments, the abutting assembly further includes a pushing member and an elastic driving member, in which the pushing member is fixedly connected to the transmission member and is protruded from the door body, an end of the elastic driving member is connected to the transmission member, and the other end thereof is connected to the door body.

In the above technical solution, when the door body is closed, the pushing member is abutted against the cabinet body, the elastic driving member is pressed at this time. When opening the door body, the elastic driving member drives the transmission member to slide, so that the abutting member is slid to lock the locking member in the locking groove via the pushing force transmitted by the inclined surface. By providing the elastic driving member, the abutting member can automatically abut against the locking member under an elastic force to form the locking structure when opening the door body, which greatly reduces the possibility that the door body falls off.

In some embodiments, the connecting assembly further includes a rotatable shaft, in which the rotatable shaft is connected other mechanism, a disengaging groove communicated with the locking groove is provided in the fixed member, the disengaging groove includes a rotating portion and a sliding portion, the rotatable shaft is rotatable in the rotating portion and is slidable in the sliding portion, an end of the sliding portion is communicated with an external environment.

In the above technical solution, by providing the disengaging groove, the rotatable shaft can not only server as the rotating axis of the door body, but also disengages from the door body. It can realize that the door body can be opened from both sides by providing two locking assembly. When the locking member is disengaged from the locking groove, the rotatable member is slid in the sliding portion of the disengaging groove, so that the rotatable shaft is disengaged from the fixed member, the door body can be opened from this side. When the rotatable shaft is positioned in the rotating portion of the disengaging groove, the door body can be rotated taken the rotatable shaft as a rotating axis.

In some embodiments, the locking assembly further includes a locking protrusion, the locking protrusion is fixedly connected to the rotatable member, the abutting member is configured to drive the locking member to abut against the rotatable shaft.

In the above technical solution, the locking protrusion can reduce the interference between the abutting member and the rotatable member, so that the door body can be smoothly opened.

In a second aspect, the present application provides an electric appliance cabinet by adopting the following technical solution.

An electric appliance cabinet includes a cabinet body and a door body, in which the door limiting mechanism described above is provided in the door body, there are two locking assemblies, each of the locking assemblies is connected to the cabinet body by one connecting assembly, and two locking assemblies are symmetrically arranged.

In the above technical solution, by providing two symmetrical locking assemblies, the door body can be rotated around the rotatable shaft at one side while the door body can be opened from another side, so as to realize that the electric appliance cabinet can be opened from both sides. The abutting assembly ensures that the door body is not easy to fall off when opening the door body by rotating.

In summary, the present application can achieve at least one of the following beneficial effects.

1. An electric appliance cabinet including the door limiting mechanism provided in the present application can be opened at two sides. The abutting member in the abutting assembly can automatically abut against the locking protrusion under elastic force when opening the door body, so that the locking member can pass through the locking groove and abut against the rotatable shaft, reducing the possibility that the door body falls off.

2. The abutting member in the abutting assembly drives the locking member to abut against the rotatable shaft when the door body is under an opening state. The door body is not easy to fall off even if the user improperly operates the driving member.

DETAILED DESCRIPTION

Figure 1:
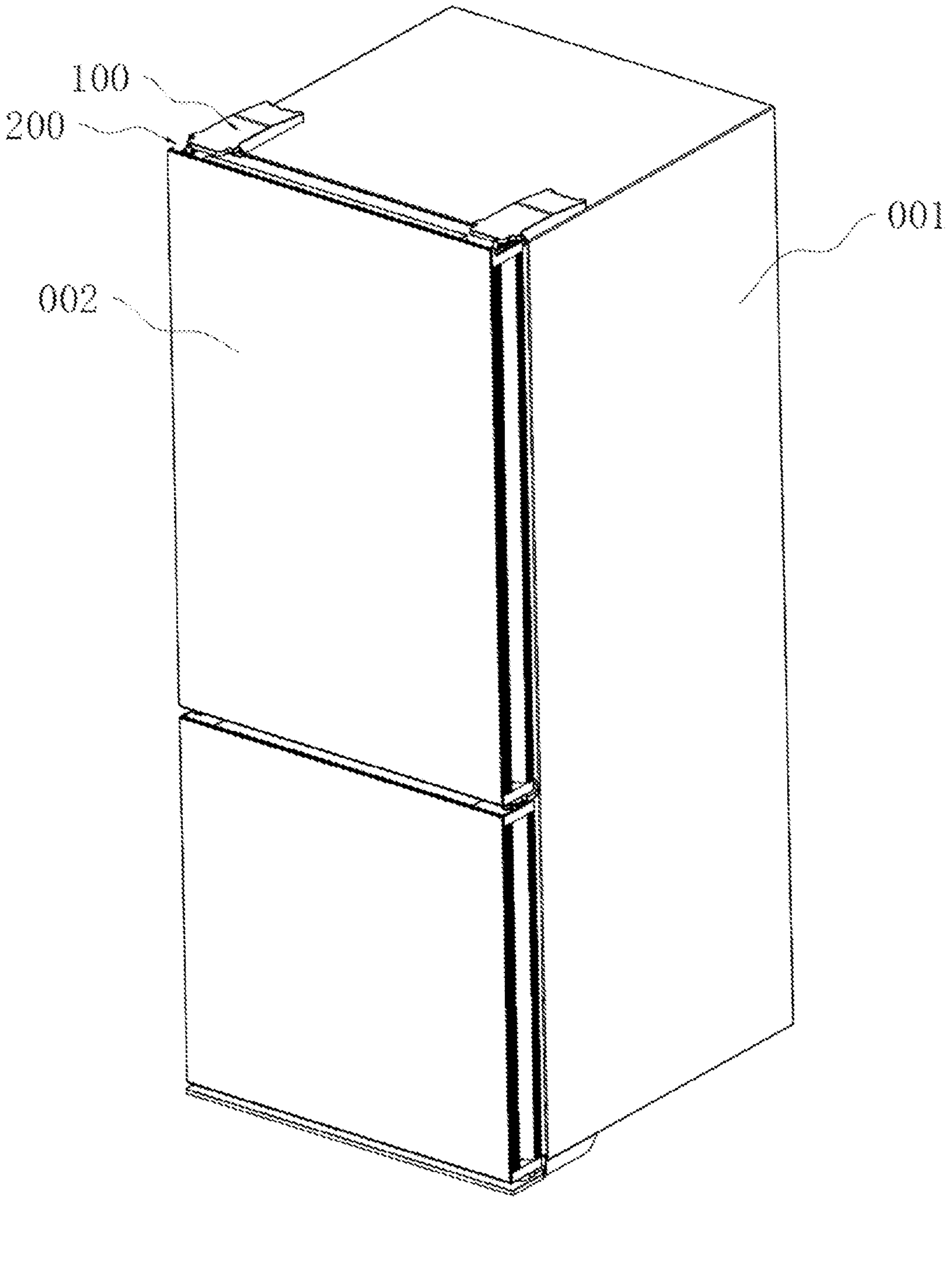
FIG. 1 is an overall structural schematic diagram of an electric appliance cabinet in an embodiment of the present application.

The present application is further described in detail below in combination with FIGS. 1-11.

The same component is marked as the same reference sign. It should be noted that, the terms “front”, “rear”, “left”, “right”, “upper” and “lower” used in the following description refer to the direction in the drawings. The terms “bottom”, “top”, “inside” and “outside” refer to a direction towards or away from the geometric center of a specific component.

The present application discloses a door limiting mechanism mounted in a cabinet structure that can be opened by rotating. An electric appliance cabinet (such as refrigerator) is taken as an example in the present application to explain the structure of the door limiting mechanism in detail.

Referring to FIG. 1, the electric appliance cabinet includes a cabinet body 001 and a door body 002. The cabinet body 001 is a cuboid structure with an opening on one side. The door body 002 is rotatably connected to the cabinet body 001.

The door body 002 can cover the opening of the cabinet body 001 for storing goods, as shown in FIG. 1. The door body 002 can be opened from left or right side by rotating, so that the opening is exposed.

Figure 2:
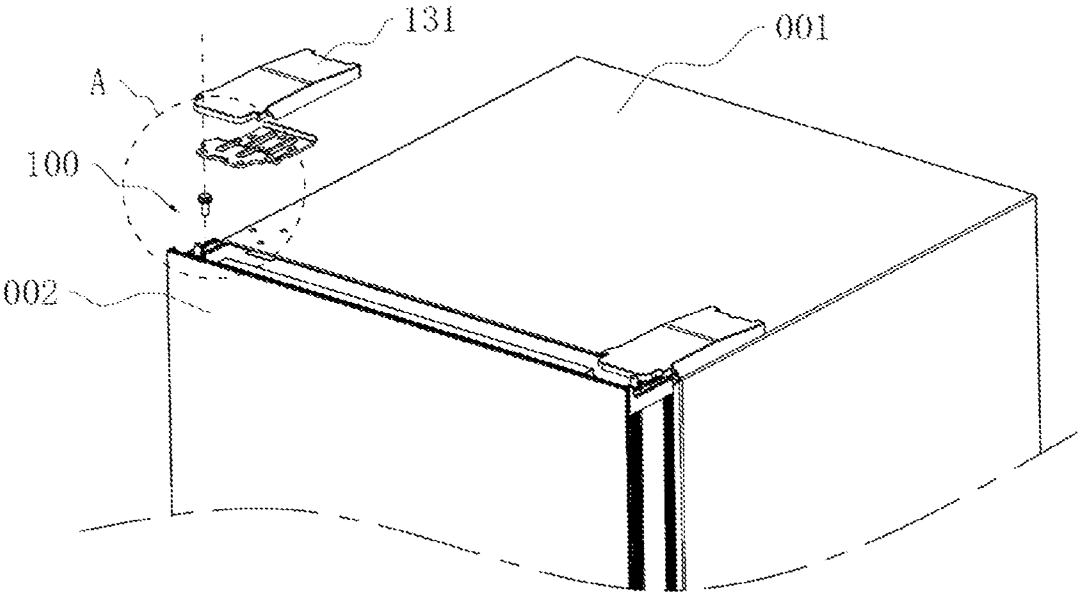
FIG. 2 is a structural explosion of a connecting assembly in a door limiting mechanism in an embodiment of the present application.
Figure 6:
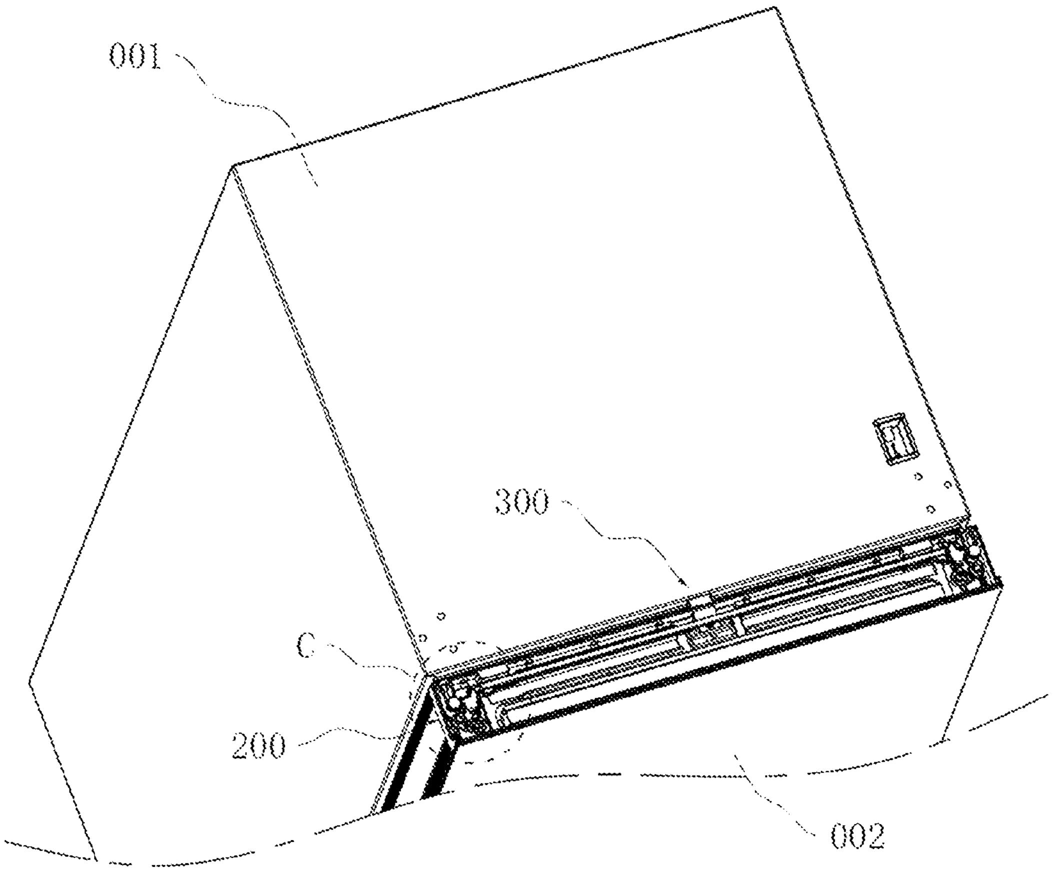
FIG. 6 is a local structural schematic diagram of an electric appliance cabinet in an embodiment of the present application, mainly for indicating a position of a door limiting mechanism in the electric appliance cabinet.

Referring to FIG. 2 and FIG. 6, the door limiting mechanism includes a connecting assembly 100, a locking assembly 200 and an abutting assembly 300. In this embodiment, there are two locking assemblies 200, which are mounted in the door body 002. Each of the locking assemblies 200 is connected to the cabinet body 001 by one connecting assembly 100. Two locking assemblies 200 are respectively positioned at left and right sides of the door body 002. The abutting assembly 300 is arranged in the middle of the door body 002.

Figure 3:
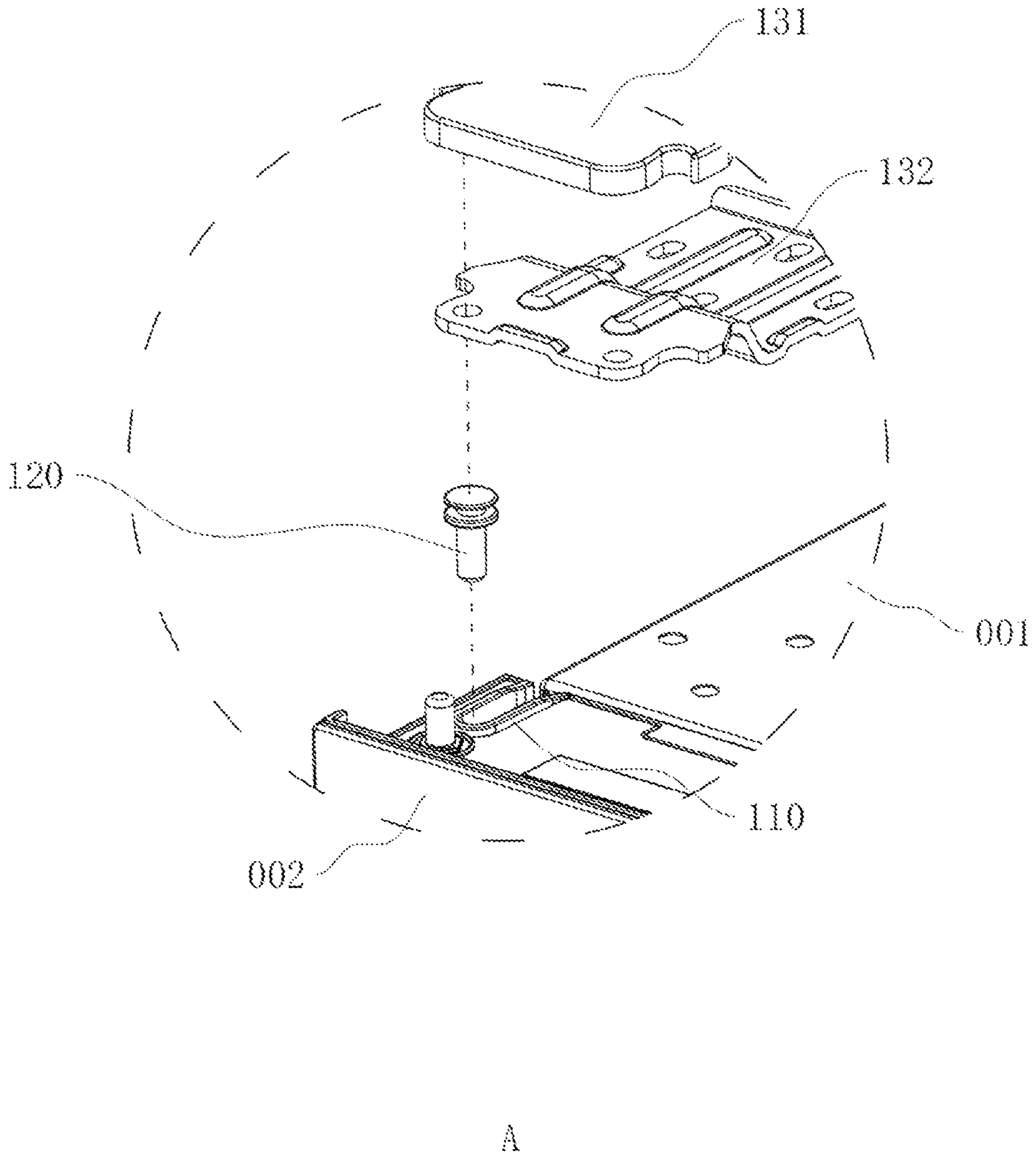
FIG. 3 is a structural enlarged diagram of portion A in FIG. 2.
Figure 4:
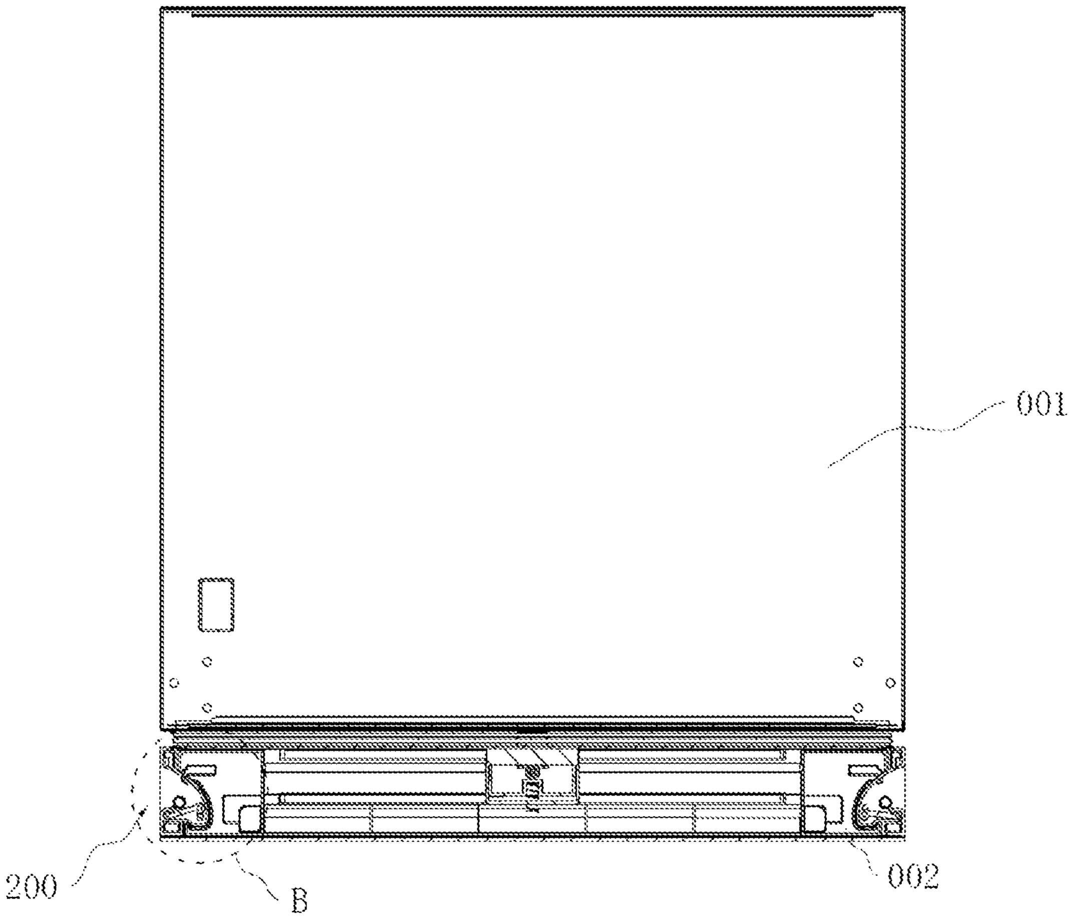
FIG. 4 is a section diagram of an electric cabinet in an embodiment of the present application, mainly for indicating a structure of a locking assembly in a door body.
Figure 7:
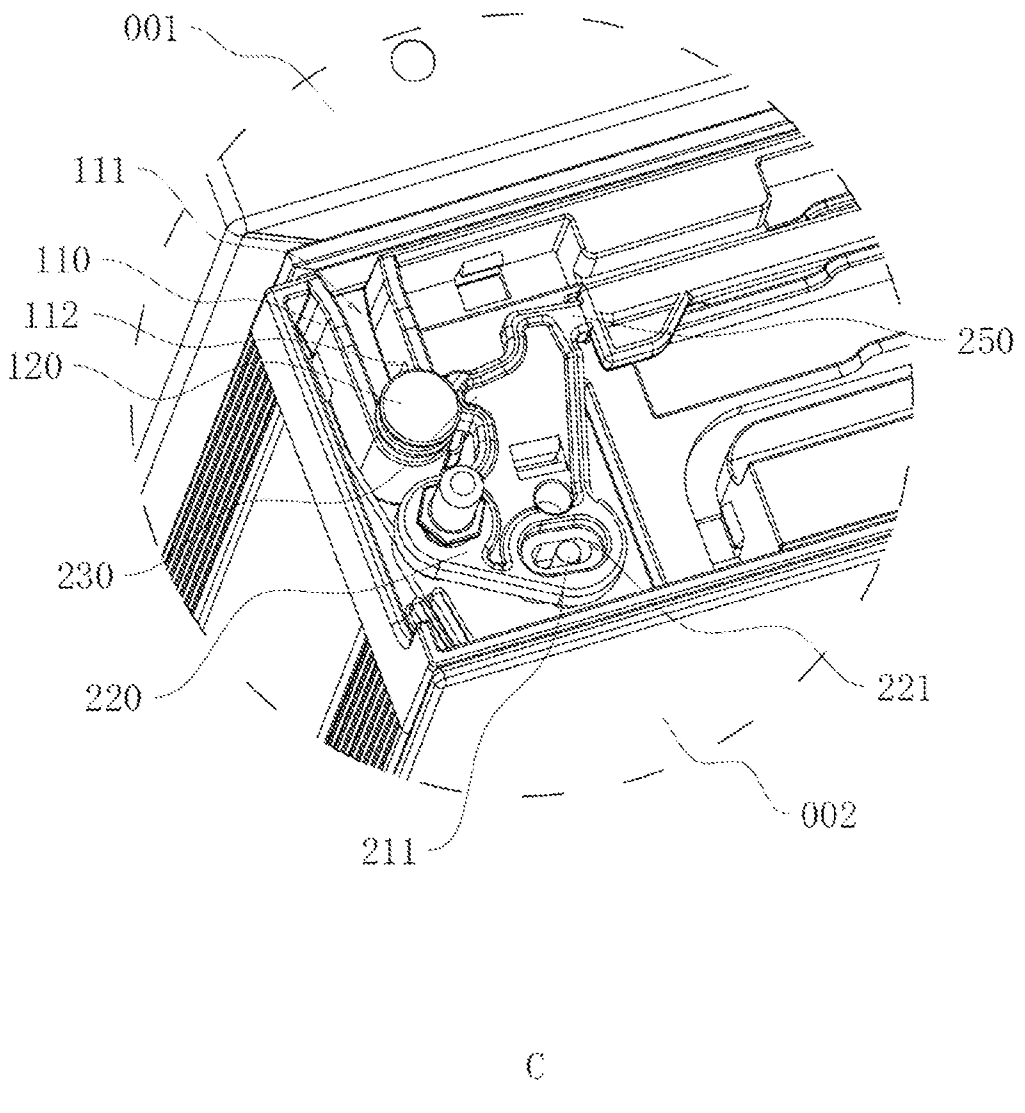
FIG. 7 is a structural enlarged diagram of portion C in FIG. 6.
Figure 8:
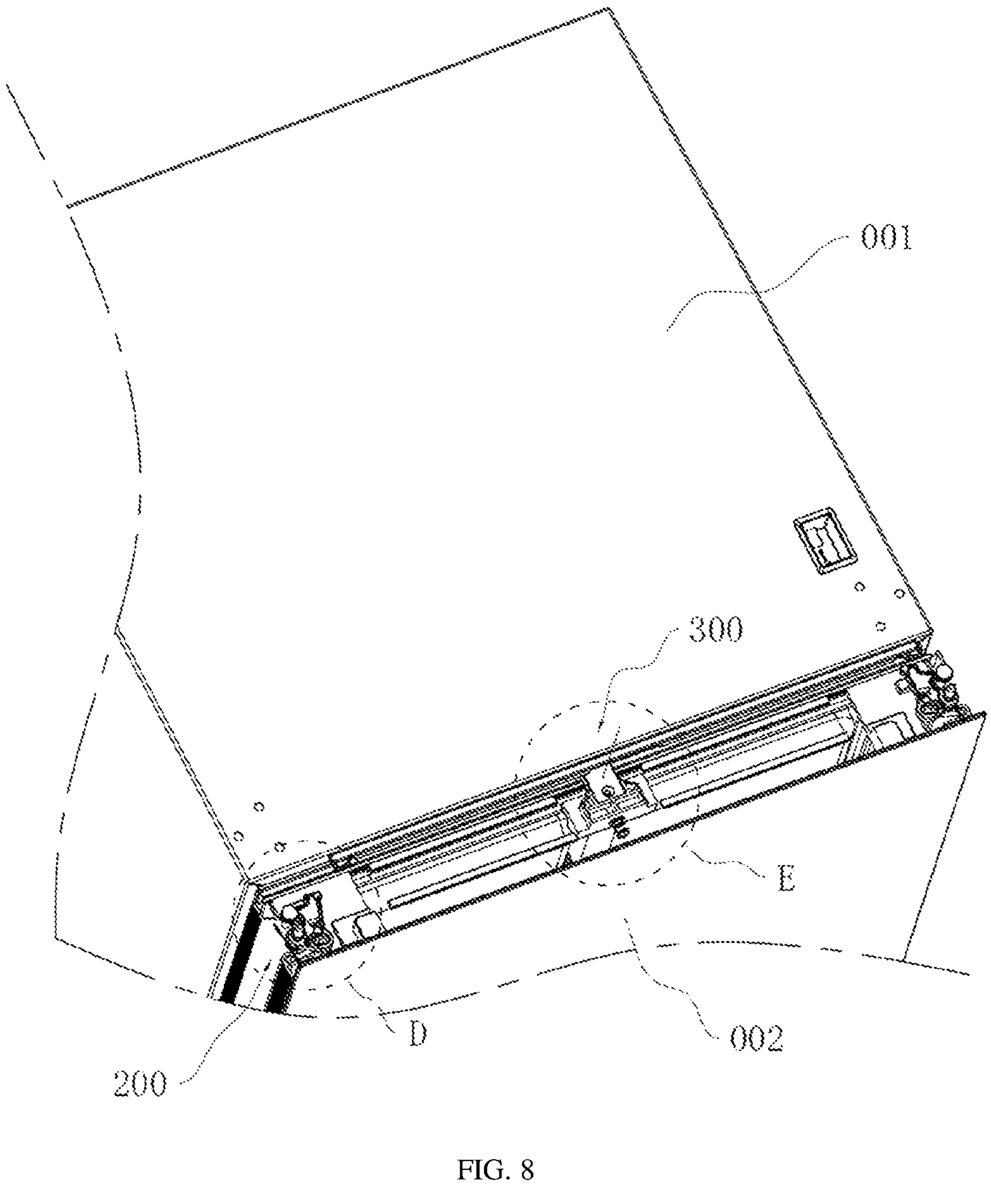
FIG. 8 is a structural schematic diagram of a locking assembly in a door limiting mechanism in an embodiment of the present application, in which a portion of a panel of a door body is hidden.

Referring to FIG. 2 and FIG. 3, the connecting assembly 100 includes a fixed member 110, a rotatable shaft 120, a first connection plate 131 and a second connection plate 132. Referring to FIG. 7, the fixed member 110 is provided in the door body 002. A disengaging groove 111 and a locking groove 112 that are communicated with each other are provided in the fixed member 110. The disengaging groove 111 includes a rotating portion and a sliding portion. The rotating portion in this embodiment has a semi-circle shape. The rotatable shaft 120 is rotatable in the rotating portion. One end of the sliding portion is communicated with the rotating portion, and the other end thereof is communicated with the external environment. The end of the sliding portion that is communicated with the external environment is towards the cabinet body 001. The width of the sliding portion is larger than a diameter of the rotatable shaft 120. In some embodiments, the end of the sliding portion that is communicated with the external environment is designed to be flared. The locking groove 112 is provided on a side where the fixed members 110 of two locking assembly 200 are face to each other. That is, for the fixed member 110 on the left side of the door body 002, the locking groove 112 is provided on the right sidewall of the fixed member 110. The locking groove 112 is communicated with the disengaging groove 111 at the sliding portion thereof. The first connection plate 131 is fixedly connected to the cabinet body 001 by blot. The second connection plate 132 is fixedly connected to the first connection plate 131. Two circular plates parallel to each other is provided in the rotatable shaft 120. A diameter of the circular plate is larger than that of the rotatable shaft 120. The second connection plate 132 is arranged between two circular plates, so that the rotatable shaft 120 is connected to the cabinet body 001.

When opening the door body 002, the rotatable shaft 120 on one side is slid out of the sliding portion of the disengaging groove 111, and the door body 002 is rotated around the rotatable shaft 120 on the other side to open.

Figure 5:
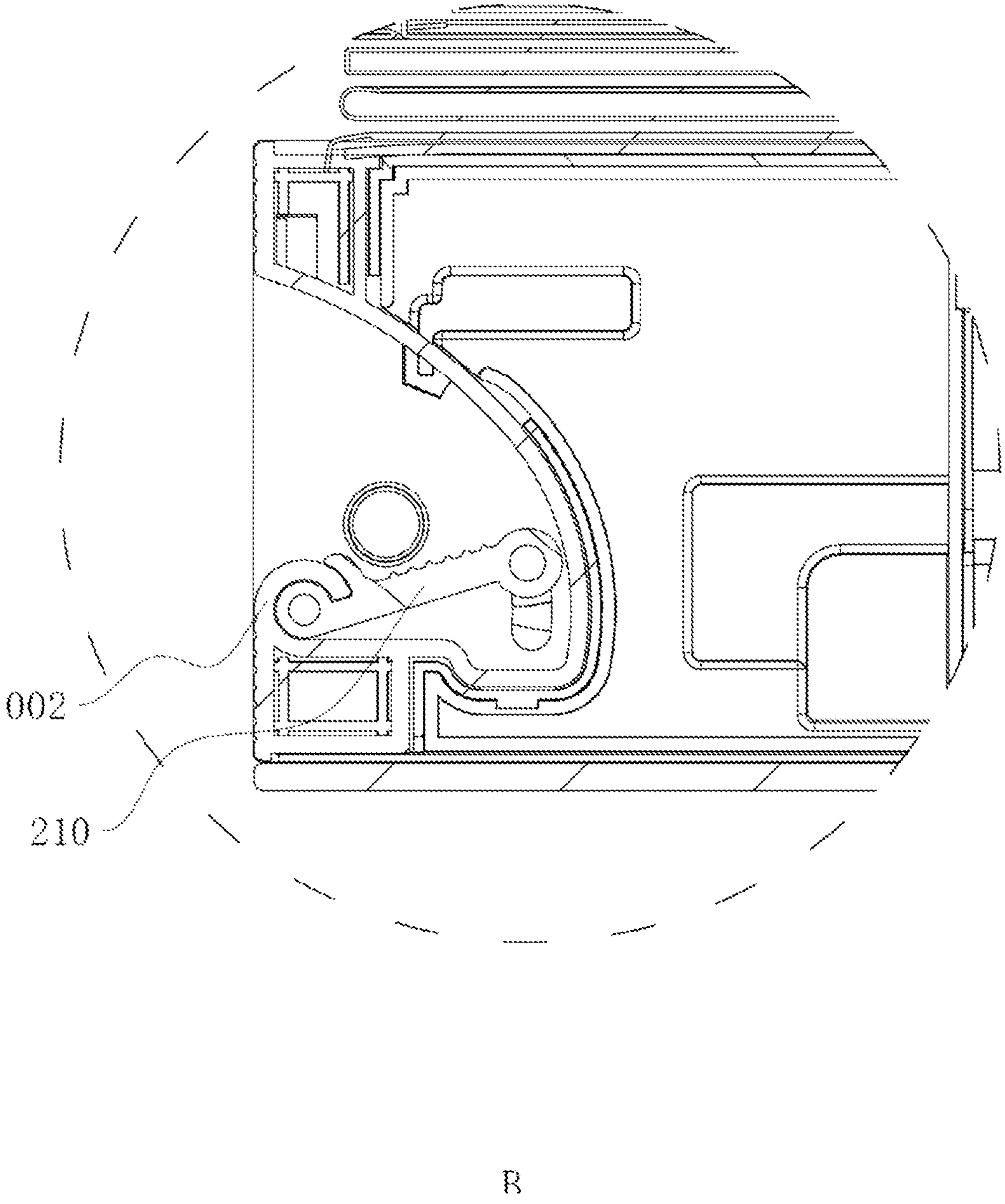
FIG. 5 is a structural enlarged diagram of portion B in FIG. 4.
Figure 9:
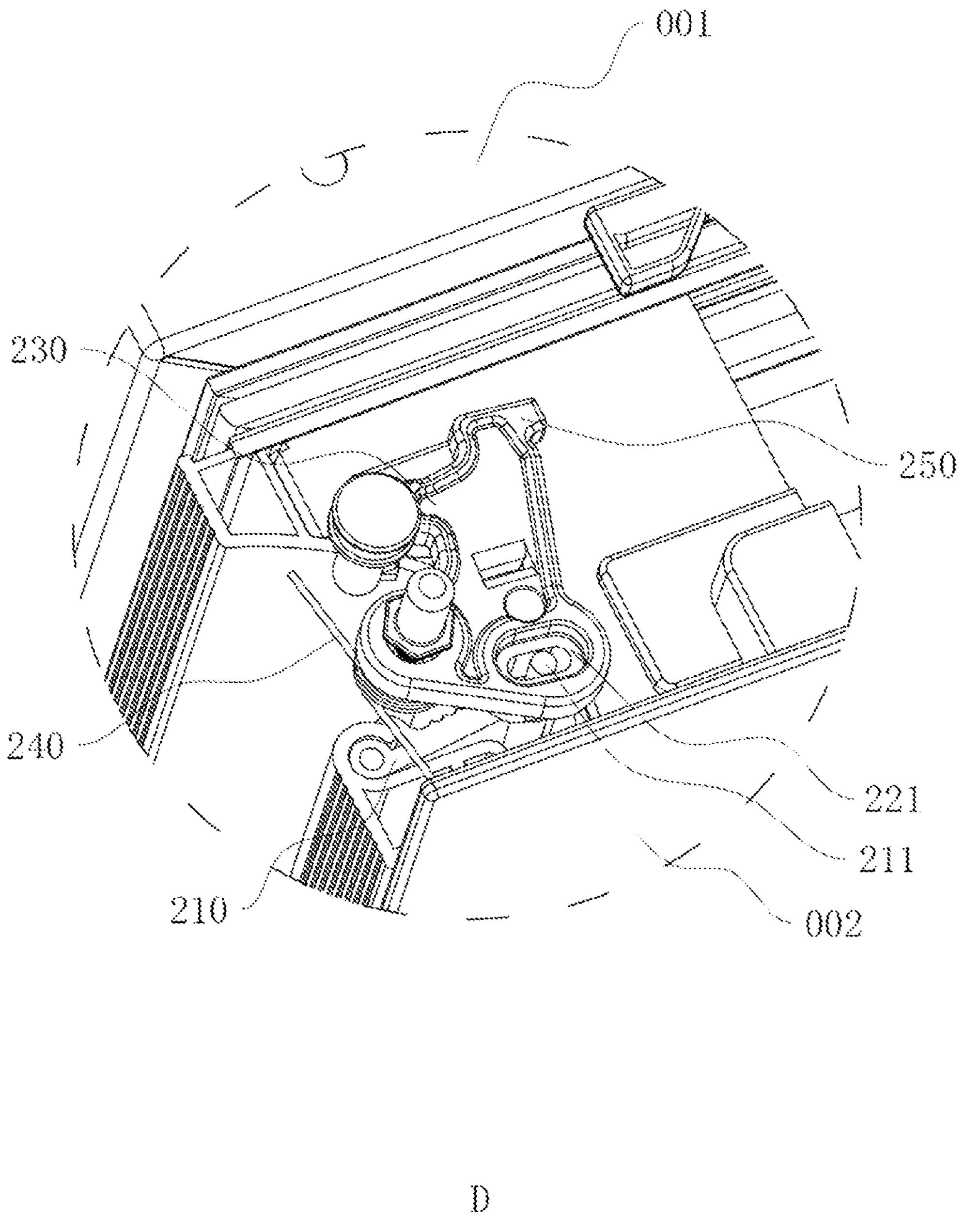
FIG. 9 is a structural enlarged diagram of portion D in FIG. 8.

Referring to FIG. 5, FIG. 7 and FIG. 9, the locking assembly 200 includes a driving member 210, a rotatable member 220, a locking member 230, an elastic returning member 240 and a locking protrusion 250. The driving member 210 is rotatably connected to the door body 002, in which the rotating axis is arranged vertically and close to the side edge of the door body 002. The length of the driving member 210 is substantially same with the length of the door body 002. A driving protrusion 211 is fixedly connected on the side of the driving member 210 away from the rotating axis of the driving member 210.

Referring to FIG. 5, FIG. 7 and FIG. 9, the rotatable member 220, the locking member 230 and the locking protrusion 250 are integrally formed. The locking member 230 and the locking protrusion 250 are respectively located on two sides of the rotatable member 220. The locking member 230 is arranged towards the fixed member 110. The rotatable member 220 is rotatably connected to the door body 002, in which the rotating axis thereof is parallel to the rotating axis of the driving member 210. A oblong groove 221 is provided in the rotatable member 220. The driving protrusion 211 penetrates in the oblong groove 221. The locking member 230 passes through the locking groove 112 and abuts against the rotatable shaft 120. In this embodiment the elastic returning member 240 is a torsional spring, which is sleeved on a rotation shaft of the rotatable member 220. The elastic returning member 240 is twisted under force when rotating the rotatable member 220. The rotatable member 220 is back to the origin position under elastic force when the user releases the driving member 210. In this embodiment, the locking member 230 has a substantially triangle shape in FIG. 3. The locking member 230 can also be designed as a sector or hook shape in other embodiments.

The working principle of the locking assembly 200 is described below by taking the door limiting mechanism on the left side of the door body for example. When opening the door body 002 from left side, the user rotates the driving member 210 clockwise. The driving protrusion 211 is slid in the oblong groove 221, so that the rotatable member 220 is rotated clockwise. The locking member 230 is disengaged from the rotatable shaft 120. In some embodiments, the locking member 230 is disengaged from the locking groove 112 at this time. The rotatable shaft 120 is slid in the disengaging groove 111, so that the door body 002 can be opened. When the door body 002 is required to open from the right side, the door body 002 is rotated around the rotatable shaft 120 on the left side.

Figure 10:
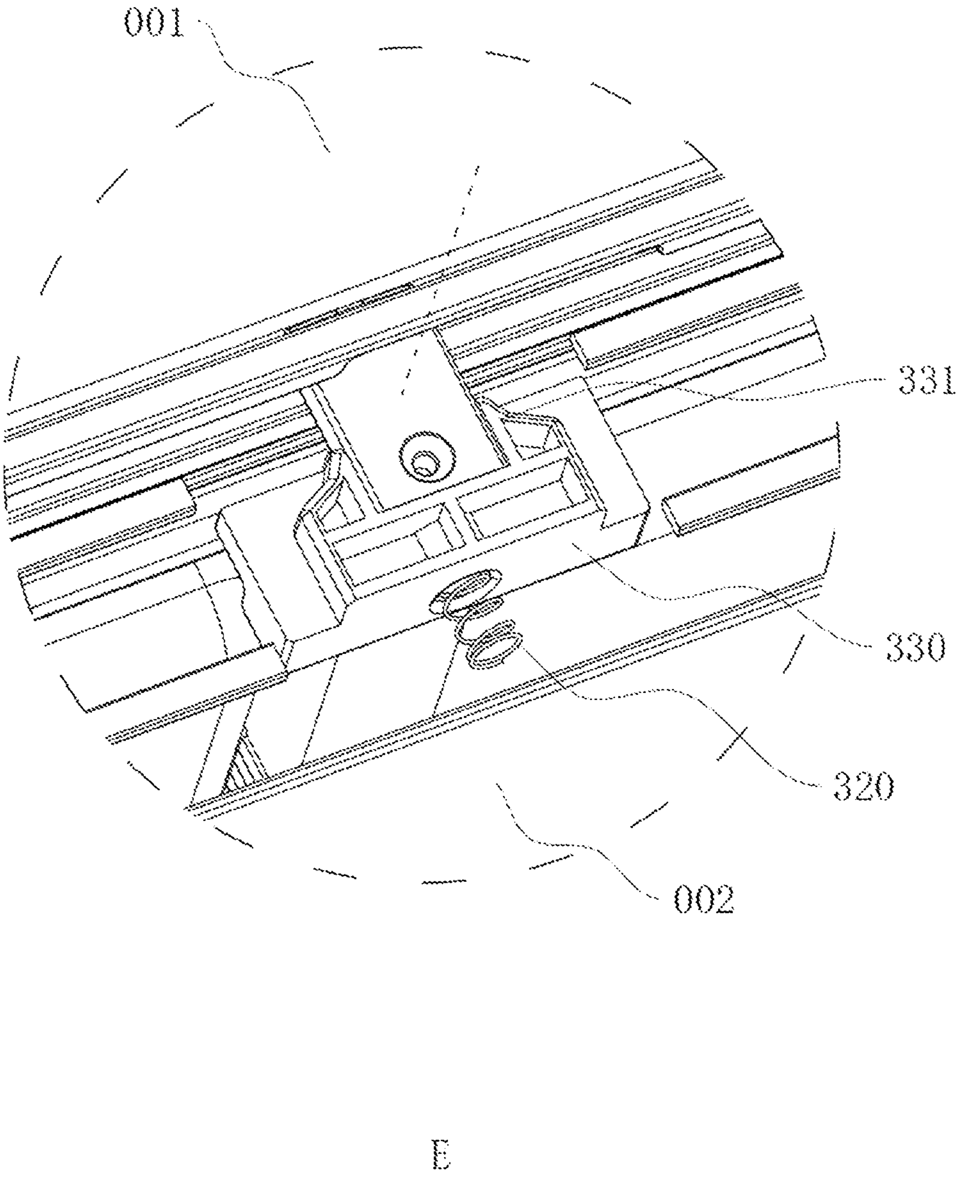
FIG. 10 is a structural enlarged diagram of portion E in FIG. 8.
Figure 11:
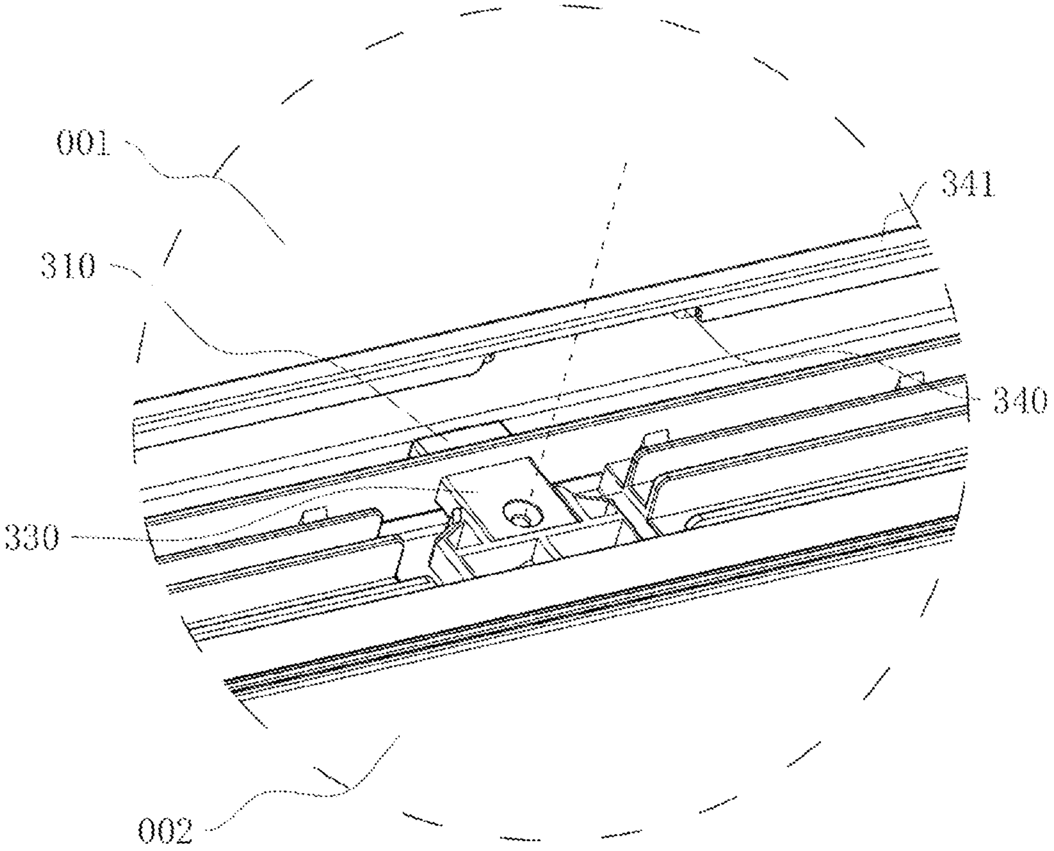
FIG. 11 is a structural explosion diagram of an abutting assembly in an embodiment of the present application.

Referring to FIG. 10 and FIG. 11, the abutting assembly 300 includes a pushing member 310, an elastic driving member 320, a transmission member 330, an abutting member 340 and a track 341. The pushing member 310 is slidably connected to the door body 002. The pushing member 310 is slid along the thickness direction of the door body 002. The pushing member 310 is protruded from the door body 002 and abuts against the cabinet body 001. The pushing member 310 is fixedly connected to the transmission member 330. Two inclined surfaces 331 are provided in the transmission member 330. Two inclined surfaces 331 are respectively faces towards two locking assemblies 200. The transmission member 330 has a first width and a second width due to the inclined surfaces 331, in which the first width is smaller than the second width. The inclined surface 331 in this embodiment is a plane surface. The inclined surface 331 can also be a curved surface in other embodiments. The track 341 is fixedly connected to the door body 002, in which the track 341 is arranged along the width direction of the door body 002. The abutting member 340 is slid relative to the door body 002 in the track 341. There are two abutting member 340, which are respectively arranged on two sides of the transmission member 330. One end of the abutting member 340 abuts against the corresponding inclined surface 331 throughout, and the other end thereof can abut against the locking protrusion 250.

When the door body 002 is closed, the pushing member 310 abuts against the cabinet body 001. The elastic driving member 320 is pressed at this time. In this embodiment, the elastic driving member 320 is a spring. At this time, one end of the abutting member 340 abuts against the transmission member 330 at the position with the first width, and the other end thereof does not abut against the locking protrusion 250. When the door body 002 is opened, the elastic driving member 320 drives the transmission member 330 to slide along the width direction of the door body 002. One end of the abutting member 340 is slide on the inclined surface 331 until reaching the position with the second width. Two abutting members 340 are moved away from each other, and respectively abut against the locking protrusions 250 on two sides, so that the locking member 230 passes through the locking groove 112 and abuts against the rotatable shaft 120. The door body 002 is not easy to fall off when opening the door body 002 by rotating.

The electric appliance cabinet provided in the present application has the following implementation principle.

When the door body 002 is opened from left side, the user rotates the driving member 210 clockwise, so that the locking member 230 is disengaged from the locking groove 112. The rotatable shaft 120 is slid in the disengaging groove 111, and the rotatable shaft 120 on the left side is disengaged from the door body 002. The door body 002 can be rotated around the rotatable shaft 120 on the right side anticlockwise to open. When opening, the rotatable shaft 120 of the locking assembly 200 on the right side is positioned in the rotating portion of the disengaging groove 111 throughout. Once the door body 002 is opened, the user releases the driving member 210, and the locking member 230 is back to the origin position. The elastic driving member 320 drives the transmission member 330 to slide, so that the abutting member 340 abuts against the locking member 230 and the rotatable shaft 120, reducing the possibility that the door body 002 fall off. Two locking assemblies 200 are symmetrically arranged, so that the door body 002 can be opened from left or right side. After the door body 002 is opened, the abutting member 340 in the abutting assembly 300 presses the locking member 230 on the rotatable shaft 120, so that the door body 002 won't fall off even if the user improperly touch the driving member 210.

The electric appliance cabinet in the present application is not limited in refrigerator, the door limiting mechanism in the present application can also be applied in wine cabinet, storage cabinet, realizing opening the cabinet door from two sides.

The above are the embodiments of the present application, which are not intended to limit the protection scope of the present application. Therefore, all equivalent changes made according to the structure, shape and principle of the present application should be covered within the protection scope of the present application.

Listing of reference signs:

001 cabinet body
002 door body
100 connecting assembly
110 fixed member
111 disengaging groove
112 locking groove
120 rotatable shaft
131 first connection plate,
132 second connection plate
200 locking assembly
210 driving member
211 driving protrusion
220 rotatable member
221 oblong groove
230 locking member
240 elastic returning member
250 locking protrusion
300 abutting assembly
310 pushing member
320 elastic driving member
330 transmission member
331 inclined surface
340 abutting member
341 track

What is claimed is:

1. A door limiting mechanism for a door body, comprising: a connecting assembly, a locking assembly and an abutting assembly, wherein:

the connecting assembly is configured to connect the door body to another structure, the connecting assembly comprises a fixed member fixedly connected to the door body, and a locking groove is defined in the fixed member, the locking assembly comprises a rotatable member and a locking member, the rotatable member is rotatably connected to the door body, and the locking member is fixedly connected to the rotatable member for passing through the locking groove to form a locking structure, the abutting assembly is configured to lock the locking member in the locking groove, and an oblong groove is defined in the rotatable member, the locking assembly further comprises a driving member rotatably connected to the door body, a driving protrusion is fixedly connected to the driving member, the driving protrusion is slidably connected in the oblong groove, wherein the driving member is driven to rotate, so that the driving protrusion is slid in the oblong groove to drive the rotatable member to rotate, thereby disengaging the locking member from the locking groove to open the door body.

2. The door limiting mechanism according to claim 1, wherein the locking assembly further comprises an elastic returning member, the elastic returning member is connected to the rotatable member, and the elastic returning member is configured to be deformed under a force when the locking member is disengaged from the locking groove.

3. The door limiting mechanism according to claim 1, wherein the abutting assembly comprises a transmission member and an abutting member, an inclined surface is provided in the transmission member, the transmission member is slidably connected to the door body in a first direction, the abutting member is configured to abut against the inclined surface, the abutting member is slidably connected to the door body in a second direction, and the transmission member is slid for driving the abutting member to slide, so that the locking member is locked in the locking groove.

4. The door limiting mechanism according to claim 3, wherein the abutting assembly further comprises a pushing member and an elastic driving member, the pushing member is fixedly connected to the transmission member and protrudes from the door body, a first end of the elastic driving member is connected to the transmission member, and a second end of the elastic driving member is connected to the door body.

5. The door limiting mechanism according to claim 3, wherein the connecting assembly further comprises a rotatable shaft, the rotatable shaft is connected to another mechanism, a disengaging groove in communication with the locking groove is defined in the fixed member, the disengaging groove comprises a rotating portion and a sliding portion, the rotatable shaft is rotatable in the rotating portion and is slidable in the sliding portion, and an end of the sliding portion is in communication with an external environment.

6. The door limiting mechanism according to claim 5, wherein the locking assembly further comprises a locking protrusion, the locking protrusion is fixedly connected to the rotatable member, and the abutting member is configured to drive the locking member to abut against the rotatable shaft.

7. An electric appliance cabinet comprising a cabinet body and a door body, wherein the door limiting mechanism according to claim 1 is provided on the door body, there are two locking assemblies, each of the locking assemblies is connected to the cabinet body by one connecting assembly, and two locking assemblies are symmetrically arranged.

* * * * *